(12) United States Patent
Nimberger

(10) Patent No.: US 6,877,718 B2
(45) Date of Patent: Apr. 12, 2005

(54) REMOTE SHUTDOWN SYSTEM AND METHOD

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 132 days.

(21) Appl. No.: 10/366,528

(22) Filed: Feb. 13, 2003

(65) Prior Publication Data

US 2004/0159814 A1 Aug. 19, 2004

(51) Int. Cl.[7] .............................................. F16K 31/00
(52) U.S. Cl. .................. 251/289; 251/129.01; 251/294
(58) Field of Search ...................... 251/294, 65, 129.01, 251/289

(56) References Cited

U.S. PATENT DOCUMENTS

| 4,310,012 | A | * | 1/1982 | Billington et al. ........... 251/294 |
| 4,811,752 | A | * | 3/1989 | Lyons et al. ................. 251/294 |
| 5,263,824 | A | * | 11/1993 | Waldbeser et al. ...... 251/129.04 |
| 5,921,266 | A | * | 7/1999 | Meyer .......................... 251/294 |
| 5,975,160 | A | * | 11/1999 | Rush ..................... 251/129.04 |
| 6,216,719 | B1 | * | 4/2001 | Meyer .......................... 251/294 |

\* cited by examiner

*Primary Examiner*—John Bastianelli
(74) *Attorney, Agent, or Firm*—Browning Bushman P.C.

(57) ABSTRACT

A system 12 and method are provided for controlling delivery of fluid product between one vessel, such as a portable vessel 32 mounted on a vehicle 30, and another vessel, with the one vessel including a manually operated product valve 14 for controlling delivery of product. The system includes an actuator 16, a cam over lever 32, closure arm 36, and an actuator 10 with an electromagnet 58. The system may include a radio transmitter 50 and a vehicle mounted receiver 52.

20 Claims, 6 Drawing Sheets

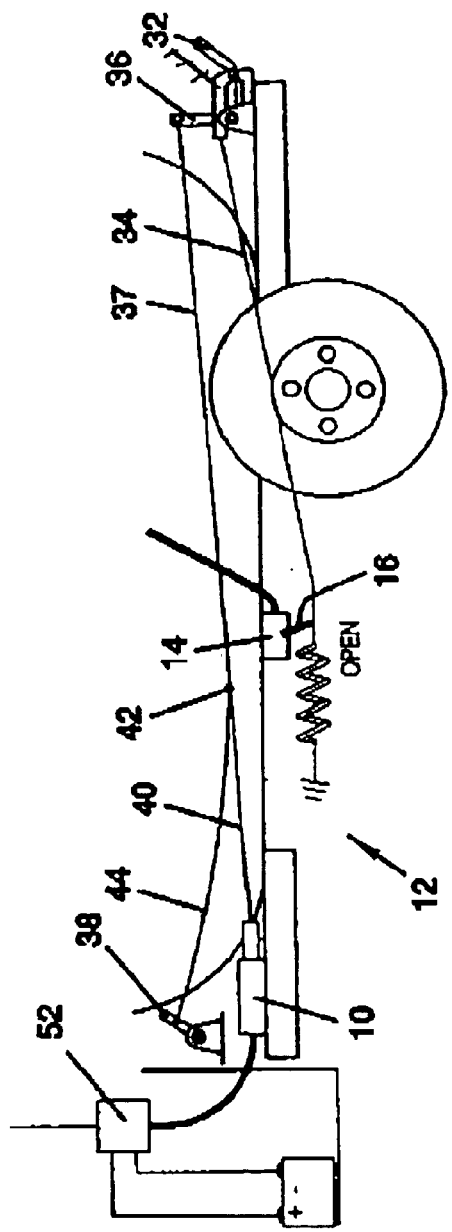
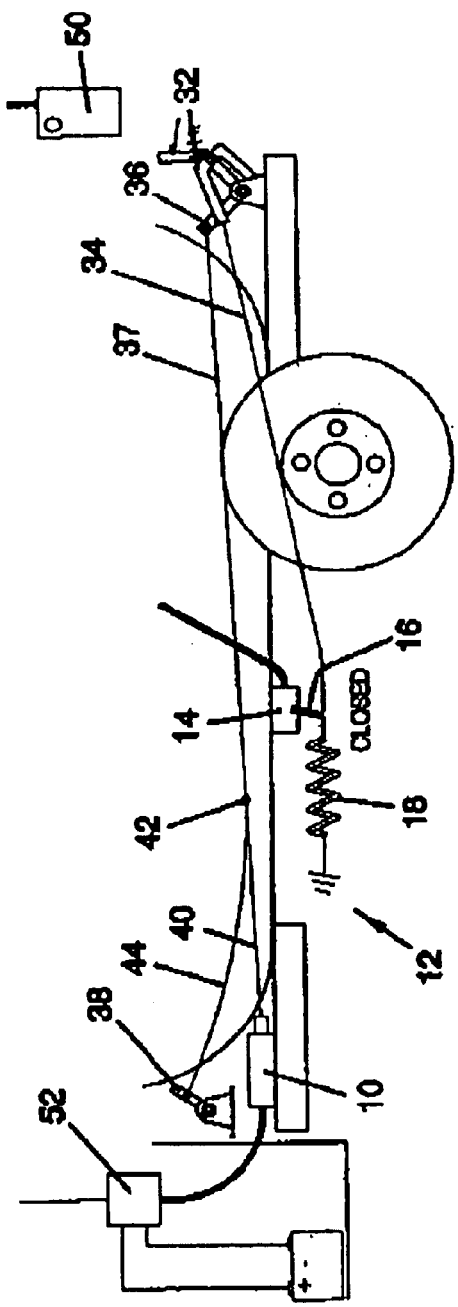

REMOTE SHUTDOWN SYSTEM AND METHOD

FIELD OF THE INVENTION

The present invention relates to a remote shutdown system to close a manually operated tank product valve on a product delivery vehicle and, more particularly, relates to a shutdown system which uses radio signals to effect shutdown.

BACKGROUND OF THE INVENTION

Existing safety shutdown systems do not provide an economical and rugged actuator that provides a strong mechanical pulling action over a distance when power is removed from the actuator. This pulling action over a predetermined distance may close a valve of the safety shutdown system. Ruggedness is desired since the actuator is typically exposed to outside environmental conditions, and often to vehicle undercarriage road conditions. In addition, the pulling action must be capable of side loading up to 20 degrees off the line of the actuator shaft, since it is not always possible to route the actuating cables perfectly in line with the actuator shaft.

The pulling force and distance required is a function of the valve being closed. In the area of safety devices for the NH3 or propane industry, the desired pulling force is approximately 50 pounds over a distance of at least one inch. This is the force and stroke needed to reliably close the typical internal valve found on delivery trucks and storage containers commonly used in the industry.

The requirement that the force be applied upon removal of power to the actuator is common practice in safety systems, so that in the event of a non-planned power loss, the device will "fail safe" and perform the desired safety function. The requirement that the safety action be performed in the absence of electrical power means that the power to perform the action must be "stored" in some form and "released" in the absence of electrical power. A common means of storing the energy to be released in the absence of electrical power is with a compressed spring. The spring is typically compressed over some distance, and then held in that potential energy position by some means. Standard pull type solenoids such as the Syncro-Start 2300 series are not suitable for this task, even though they have the required holding power, because the solenoid shaft cannot be "pulled" into the latch position as is required for a device that will compress and then hold the spring compressed. The Syncro-Start 1700 push series solenoids are more suitable for the task because the shaft can be pulled through a distance to compress a spring and into engagement with the "holding" position of the solenoid. However, push style solenoids inherently do not have a high ratio of "push" to "holding" power, and are only marginally suitable as safety shutdown actuators in the NH3 and propane industry.

The disadvantages of the prior art are overcome by the present invention, and an economical and highly reliable remote shutdown system and method are hereinafter disclosed to close a manually operated tank product valve on a product delivery vehicle.

SUMMARY OF THE INVENTION

An object of the present invention is to provide an economical and rugged actuator for a remote shutdown system to close a product operated tank valve that will tolerate side loading while supplying the required loads and stroke, yet be capable of being extended to a selected load and stroke.

Another object of the invention is to provide an improved system for controlling delivery of fluid product between a portable vessel mounted on a vehicle and another vessel, wherein the vehicle includes a manually operated product valve for controlling delivery of product. The system includes a valve actuator connected to move the product delivery valve to a closed position, and a cam over lever attached by a first tether to the valve actuator, a closure arm rotatable about a common axis with the cam over lever. A powered actuator is connected with a second tether, such that when the closure arm is tripped by the powered actuator, the second tether is slack and the product valve is closed. An electromagnet within the powered actuator retains the second tether generally taut and pulls on the second tether in response to the absence of power to the electromagnet. In a preferred embodiment, a shut off lever is mounted on the vehicle, and a third tether extends between the closure arm and the shut off lever. A biasing spring is preferably used to bias the actuator to close the product delivery valve.

It is a feature of the invention that the remote shut-down system may include a hand held radio transmitter, and a vehicle receiver responsive to the transmitter for selectively applying power to the actuator. An electrical cable may extend from the vehicle battery to the actuator for selectively activating the actuator.

It is an advantage of the shut down system components are each reliable and commercially available, thereby reducing the cost of both supplying and maintaining the system.

These and further objects, features, and advantages of the present invention will become apparent in the following detailed description, when reference is made to the figures in the accompanying drawings.

BRIEF DESCRIPTION OF THE DRAWINGS

FIG. 2 illustrates a portion of the vehicle and the tank product valve open in preparation for delivery of product.

FIG. 3 illustrates the product delivery valve closed.

DETAILED DESCRIPTION OF THE PREFERRED EMBODIMENTS

Figure 1:
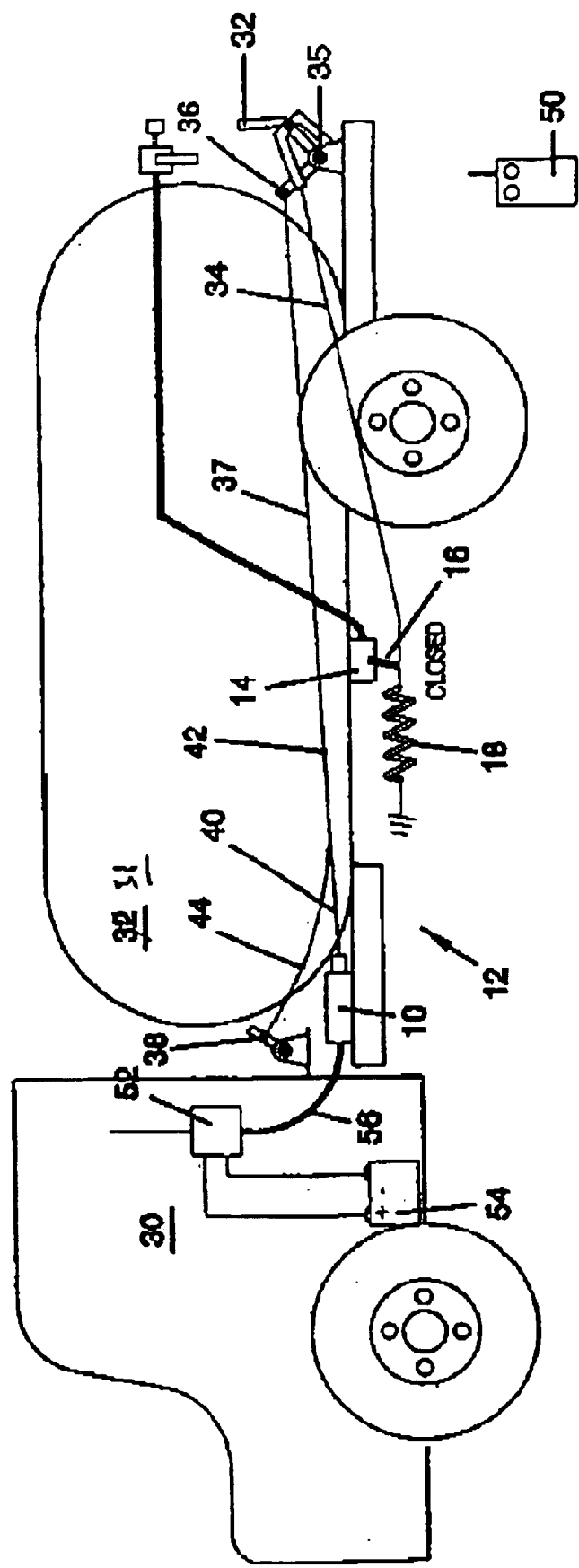
FIG. 1 is a side view of a portion of the vehicle with a remote shutdown system to close a manually operated produce valve.

Referring to FIG. 1, the actuator 10 is component of the remote shutdown system 12 used to close a manually operated tank product valve 14 on a propane or other hazardous product delivery truck 30 carrying tank 31, preferably using a DOT mandated remote controlled shutdown system, as explained below. The tank product valve 14 controls the availability of product to the delivery system, is commonly mounted near the bottom of the propane containment vessel 31, and generally includes "excess flow"

functionality. A lever or other actuator 16 on the side of the valve 14 maybe biased to a closed position with a spring 18, as shown in FIG. 1. On the rear deck of delivery truck 30 is mounted a cam over lever 32 attached by cable or other tether 34 to control lever 16 on the tank product valve 14, as shown in FIG. 1. The cam over level 32, when rotated to the open position, will lock itself in that position by a cam over design of the lever.

A closure arm 36 is mounted about the same primary pivot axis 35 as the cam over lever 32, and is attached by cable 37 to a manual emergency shutoff lever 38, typically mounted near the front of the truck 30. Delivery of product is enabled by pulling the cam over lever 32 to the open position, which pulls on the attached cable 34 to open the tank product valve 14. In the open position, the "cam over" function allows the operator to release a manual grasp of the cam over lever 32 to commence delivery of product. Any time the tank product valve 14 is open, it may be closed by either rotating the cam over lever 32 to its closed position directly, or by operating the emergency shutoff lever 38 at the front of the truck, which will rotate the closure arm 36 and force the cam over lever 32 to a closed position.

FIG. 1 illustrates the system 12 including the actuator 10 mounted to the frame of the truck 30 with its operating cable 40 connected to an existing emergency shutoff lever cable 37 at attachment point 42. The actuator operating cable 40 and a section of the existing emergency shutoff lever cable 37 between the attachment point 42 and closure arm 36 is taut, as shown in FIG. 1, such that when the closure arm 36 is rotated to its closed or tripped position, the cable 44 between the emergency shutoff lever 38 and the connection point 42 is slack. The tank product lever 16 is in its closed position, with the cam over lever 32 also in its closed position. This is a typical position of the system components when the delivery system is not enabled for delivery of product. A system variation would eliminate the manual emergency shutoff lever 38 and use only the actuator 10 for emergency shutdown.

In the embodiment illustrated as shown in FIG. 1, the manual emergency shutdown device is operational. The remaining components of the remote shutdown system 12 include a handheld transmitter 50 and a truck mounted receiver 52 powered from truck battery 54, with power applied to the actuator 10 by an electrical cable 56.

Figure 5:
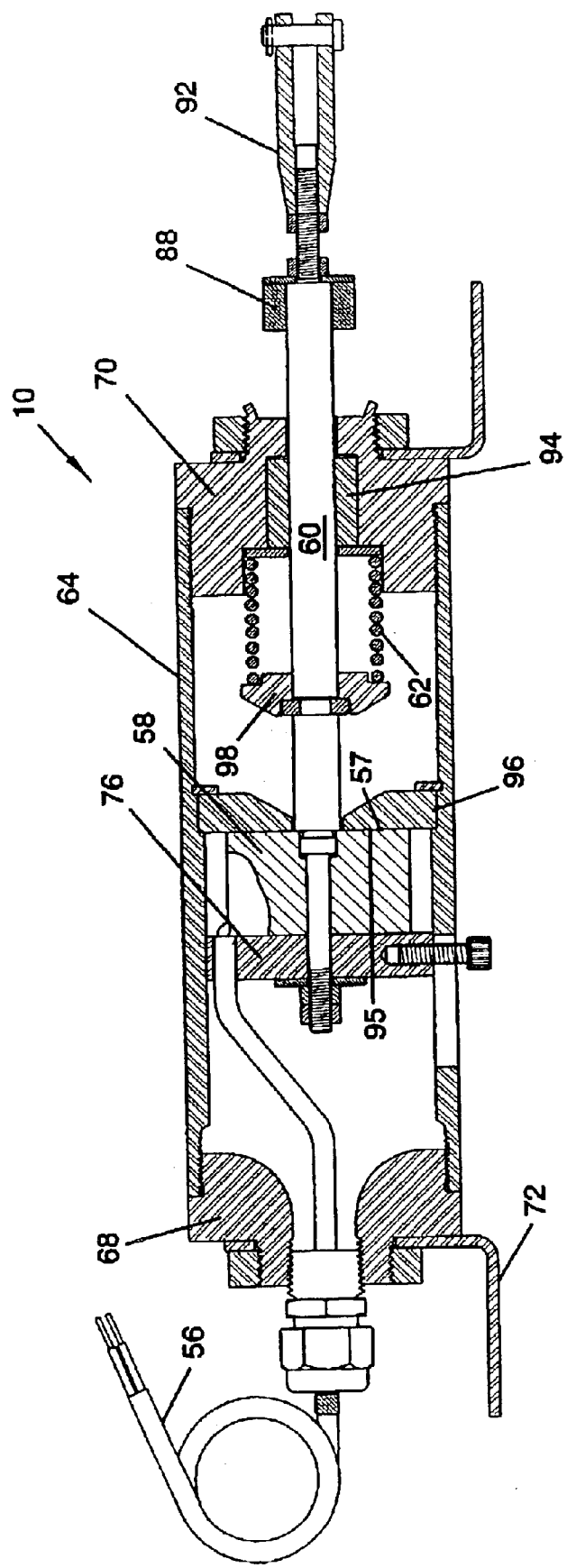
FIG. 5 is a sectional view of the actuator shown in FIG. 4 in its cocked or open position.

FIG. 2 shows the operation of the actuator 10 as the tank product valve 14 is being opened in preparation for delivery of product. The system receiver 52 is powered on, which is typically accomplished concurrent with and dependent on setting of the vehicle parking brake. With power applied to the safety system 12, power is also applied to an electromagnet 58 located within the actuator 10, as shown in FIG. 5. The delivery vehicle operator will then rotate the cam over lever 32 to its open position, which pulls on cable 34 to open lever 16 on the tank product valve 14, as shown in FIG. 2.

The act of opening the cam over lever 32 will also cause the closure arm 36 to rotate with it, which pulls the cable 37 attached to the shaft 60 of the actuator 10 (see FIG. 5). As the cable pulls on the shaft 60, a spring 62 within the actuator housing 64 is compressed to a selected load level, e.g., a 55 pound load. Since power has been applied to electromagnet 58 internal to the actuator 10, a magnetic latch will be made to prevent the spring 62 from returning the closure arm 36 to its closed position. Once the closure arm 36 has been cocked and magnetically latched open, the cam over lever 32 may be operated to its closed or open positions, as desired. Cable 44 at this time is still slack.

Figure 4:
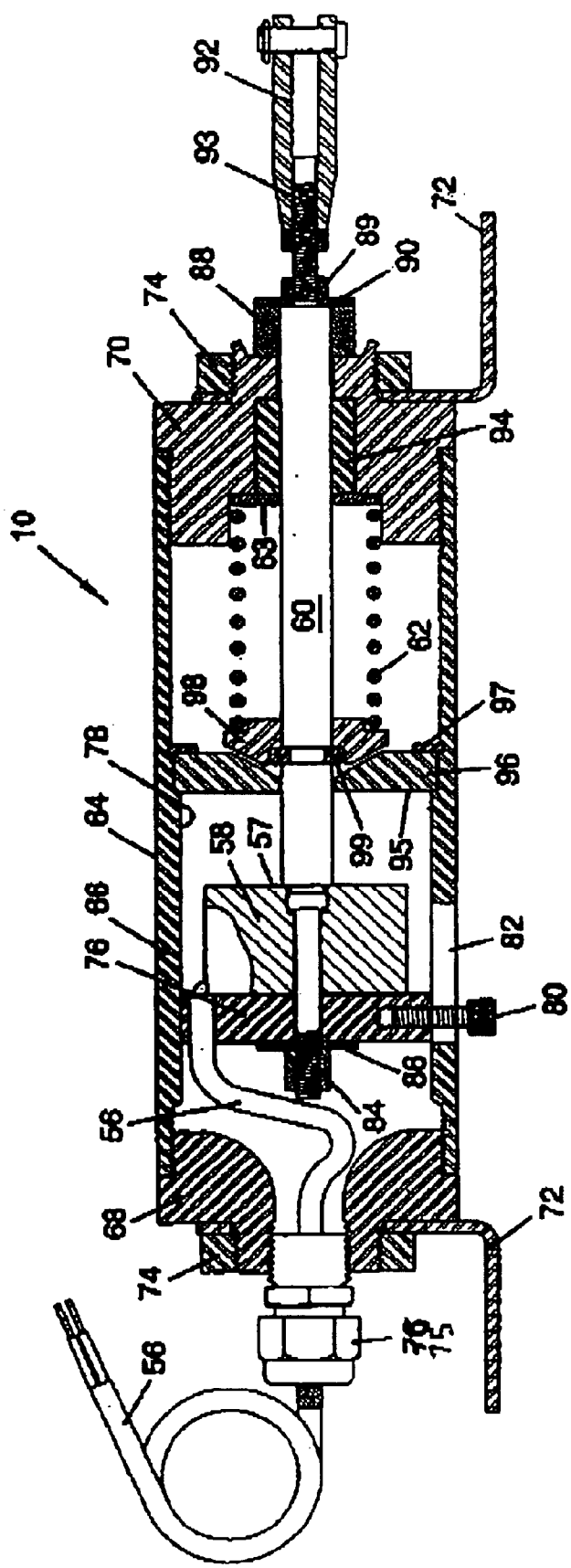
FIG. 4 is a sectional view through a suitable actuator in the tripped or closed position.

For the embodiment as shown in FIG. 4, the actuator housing comprises a sleeve-shaped body 66 which is threaded at one end to a power end cap 88 and at its opposing to a tether end cap 70. Mounting bracket 72 is shown for mounting each end of the actuator to the vehicle, with a threaded bracket nut 74 securing the respective end cap to the bracket. Nipple 75 is threaded to the end cap 68, and transmits electrical power from cable 58 through the end cap and into the interior of the housing 64, and then into electrical contact with the electromagnet 58.

A cylindrical guide 76, preferably manufactured from a suitable plastic such as Delrin™, has an outer surface which engages the cylindrical interior surface 78 of the sleeve 66 during movement of the electromagnet. An anti-rotation member such as bolt 80 may be connected to the guide 76, and passes through an axially extending slot 82 in the sleeve 66 to allow axial movement while preventing rotational movement of the guide 76 within the housing 64.

Shaft 60 is connected by lock nuts 84 and washer 86 to the guide 76, and is connected at its opposing end to bumper 88 secured to the rod 60 by nut 89 and washer 90. Clevis 92 is threaded to the end 93 of rod 60, and is then attached in the conventional manner to the tether 40 shown in FIG. 1. Bushing 94, which may also be manufactured from Delrin™, is provided between end cap 70 and shaft 60 to provide for guided axial movement of the shaft within the housing. Magnetic latch plate 96 is attached to the housing 64, e.g, by snap ring 97. Spring guide 98 is positioned on the shaft 60 and held in place by C-washer 99. The opposing end of the spring 62 engages washer 63, which preferably is positioned within the end cap 70 and in engagement with the bushing 94. For the FIG. 4 embodiment, the spring 60 may be loaded to about 30 pounds. When fully compressed in the latched position, as shown in FIG. 5, the spring loading is about 55 pounds. If no power is supplied to electromagnet 58, the load spring 62 biases the actuator to the unlatched position, as shown in FIG. 4.

In the cocked and latched position as shown in FIG. 5, the planar face 57 of the electromagnet 58 is in planar engagement with the planar surface 95 of latch plate 96. The design of the actuator 10 as shown in FIGS. 4 and 5 is relatively compact, yet the bushing 94 is desirably spaced axially a considerable distance from the face 95 of the latch plate 96, and the guide 76 is spaced axially a considerable distance from the face 57 of the electromagnet 58, so that both ends of the shaft 60 are effectively guided over an axially long distance.

If power is dropped from electromagnet 58 internal to the actuator 10 by activation of the safety features of the shutdown system, as shown in FIG. 3, the spring 62 will return the closure arm 36 to the closed position with a selected cable pulling force, and the cam over level 32 will close, allowing the spring 18 to close the lever 16 on the tank product valve 14.

Figures 6, 7:
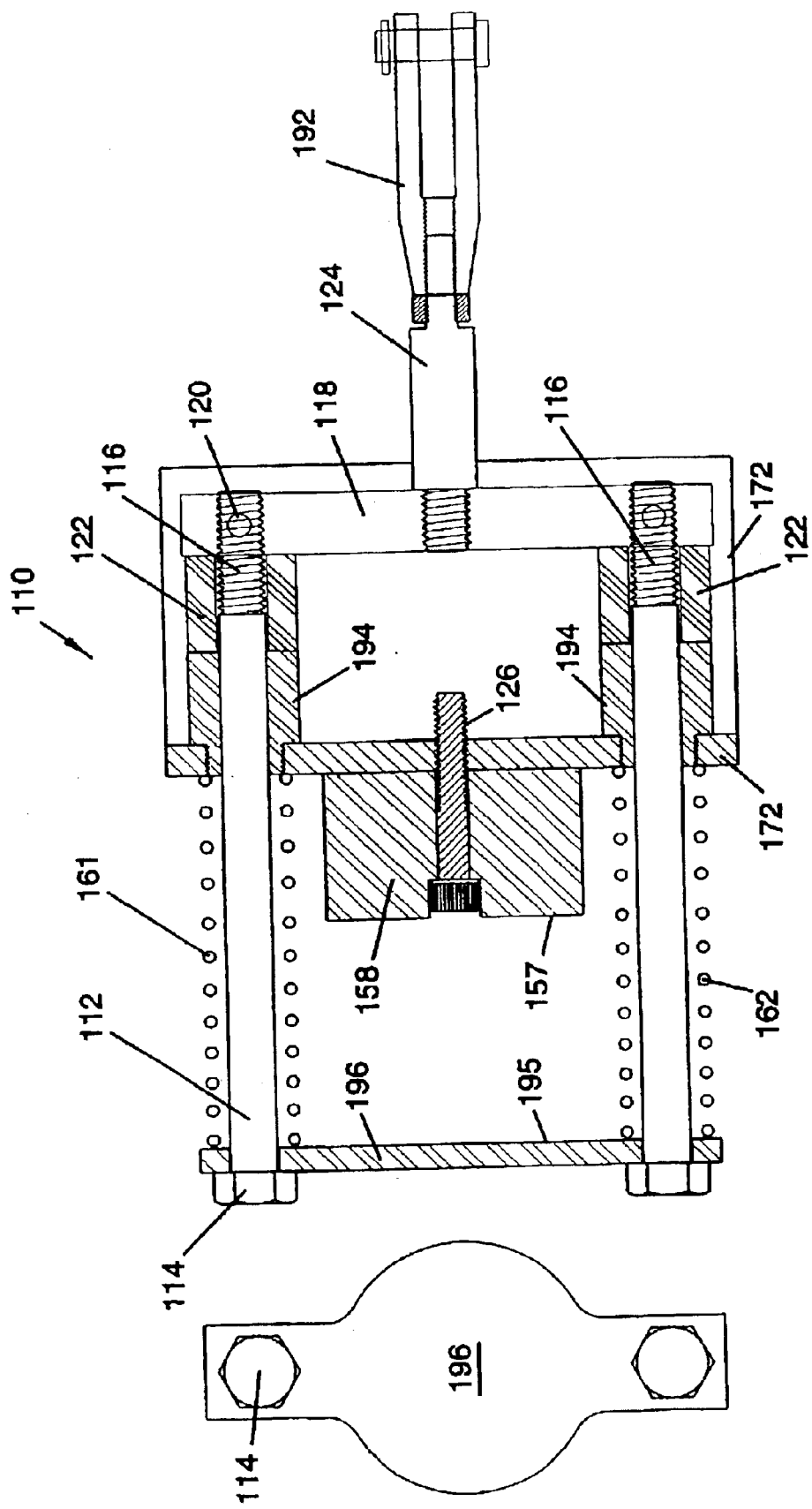
FIG. 6 illustrates an open yoke embodiment of an actuator.
FIG. 7 is an end view of the actuator shown in FIG. 6.

A characteristic of an electromagnet is that with rather low power and smell size: the device may hold a relatively large amount of weight if closely attached to a flat, highly magnetic steel member. A solenoid is capable of generating magnetic pull over a given length; an electromagnet has little ability in this regard and instead is brought in close contact with the member it will latch with. Other embodiments to accomplish this goal may include an "open yolk" design, as shown in FIGS. 6 and 7. The actuator 110 includes an electromagnet 158 and a latch plate 196 with a planar surface 195 adapted for engagement with the planar surface 157 of the electromagnet. A pair of coil springs 161 and 162 accomplish the function of the spring 62 discussed above. Angle bracket 172 is provided, and a pair of guide bushings 194 are threaded to ports in the bracket 172, each for guiding the respective bolt 112 with a head 114 in engagement with plate 196, and a threaded end 116 threaded to yoke 118 and secured in place by lockpin 120. A pair of sleeve-shaped bumpers 122 are provided for cushioning engagement of a guide bushing 194 with the yoke 118. Connecting pin 124 interconnects the clevis 192 with the yoke 118, and bolt 126 is threaded to the bracket 172 for securing the electromagnet 158 in place. Cable tension pulls the yoke and thus pulls the latch plate 196 into engagement with electromagnet 158, compressing the coil springs 161 and 162. A relatively small amount of electrical power to the magnet 58 will hold the actuator in that position. The release of electrical power will then allow the coil springs to return the controller to the position as shown in FIG. 6. A design similar to that depicted in FIG. 4 is preferred since it is less susceptible to jamming, is inherently rugged, is well protected, and has good mounting flexibility.

Figure 8:
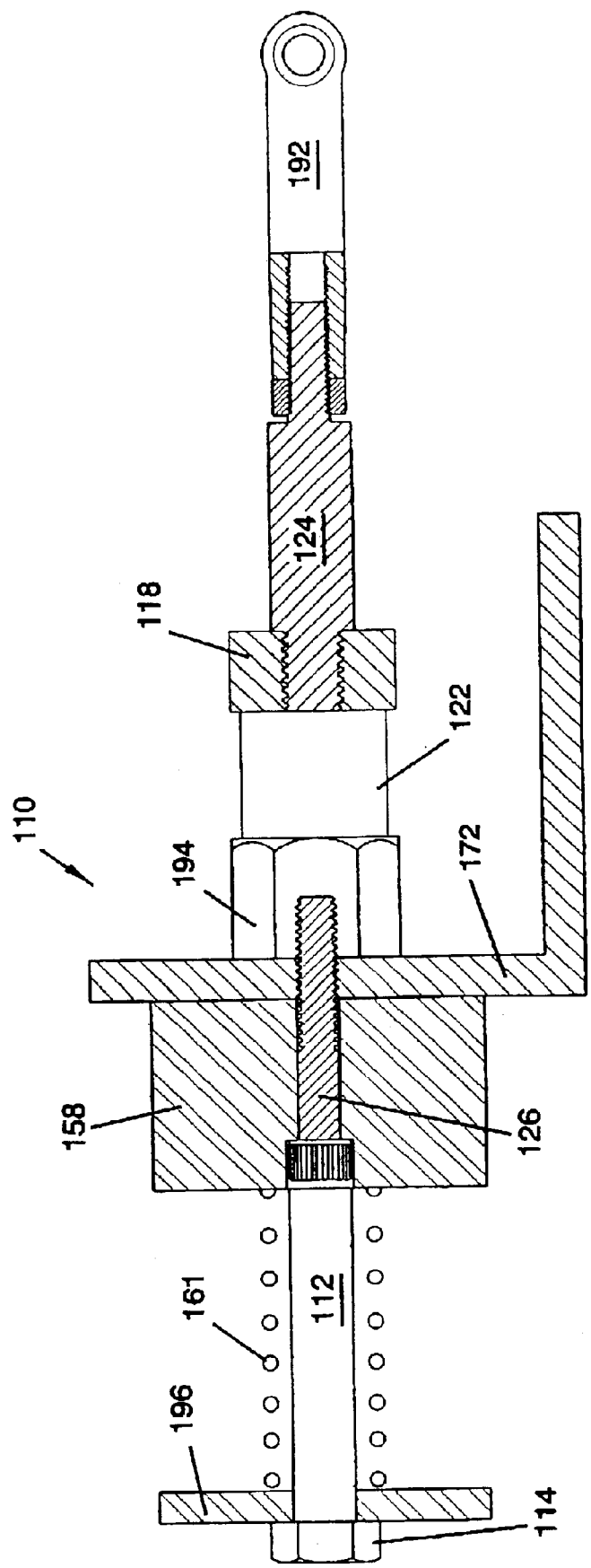
FIG. 8 is a cross-sectional side view of the embodiment shown in FIG. 6.

FIG. 8 illustrates a side view of the actuator 110 supported by angle bracket 172 on the vehicle. Electromagnet 158 is secured to the bracket 272 by bolt 126. Coil spring 161 biases latch plate 196 away from the electromagnet 158. Threaded rod 112 has its bolt head 114 in engagement with latch plate 196, and threaded end 116 converted to yoke 118. Connector pin 124 interconnects the yoke 118 with clevis 192. Bumper 122 is positioned between the guide bushing 194 and the yoke 118.

While the design as shown in FIG. 6 is axially more compact than the design as shown on FIG. 4, the FIG. 4 design is preferred since the combination of the axially spaced bushing and the electromagnet guide allow for relatively high side loading from forces transmitted by the cable to the actuator. In a preferred embodiment of the invention, the planar face of the electromagnet which is in planar engagement with the planer face of the latch plate when power is supplied to the electromagnet is at least about 2 square inches, and in a preferred embodiment is greater then about 2 ¾ square inches. With this relatively large surface area, a small amount of power can be supplied to the electromagnet to withstand the biasing force of the spring attempting to disengage the electromagnet from the latch plate, which in the preferred embodiment has a force of at least 50 pounds, preferably at least 55 pounds, and in many applications will be 60 pounds or more.

As shown in the figures, the actuator preferably allows the electromagnet to move with respect to the latch plate, or the latch plate may move with respect to the electromagnet, along an axis which is substantially aligned with the tether connected to the actuator.

In a preferred embodiment discussed above, the safety system is used for controlling delivery of fluid between the portable vessel mounted on the vehicle and a stationary vessel. The safety shut down system thus has particular applicability for vehicles which transport NH3 or propane from trucks carrying portable vessels to, e.g., home or business storage tanks. In other applications, the safety system may be used to control delivery of fluid product between any two vessels, with one vessel including a manually operated product valve which, as disclosed above, is located on the vehicle when the one vessel is a portable vessel. The safety system may thus be used, for example, to control delivery of fluid from a large stationary vessel to one or more smaller stationary vessels, with a large vessel including the manually operated product valve which is responsive to the safety system disclosed herein. For all applications, there are significant advantages to the safety system also being responsive to a radio or other wireless transmission system, so that the operator may carry a handheld radio transmitter, with the receiver provided on or adjacent the one vessel and responsive to the handheld transmitter for selectively activating the actuator.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A system for controlling delivery of fluid product between one vessel and another vessel, the one vessel including a manually operated product valve for controlling delivery of product, the system comprising:
   a valve actuator connected to move the product delivery valve to a closed position;
   a cam over lever attached by a first tether to the valve actuator;
   a closure arm rotated by the cam over lever between an open position and a closed position;
   a powered actuator connected with a second tether to the closure arm, such that when the closure arm is tripped, the second tether is slack, and the product valve is closed; and
   an electromagnet supported on the powered actuator and powered to retain the closure member in the open position and the powered actuator to pulls the second tether in response to an absence of power to the electromagnet to close the product delivery valve.

2. A system for controlling delivery of fluid product as defined in claim 1, further comprising:
   a shut off lever for controlling fluid flow from the one vessel; and
   a third tether between the closure arm and the shut off lever.

3. A system for controlling delivery of fluid product as defined in claim 1, further comprising:
   the powered actuator including an actuator housing; and
   a biasing spring carried by the actuator housing for biasing the powered actuator to close the product delivery valve.

4. A system for controlling delivery of fluid product as defined in claim 1, further comprising:
   a handheld radio transmitter; and
   a receiver responsive to the handheld transmitter for selectively activating the actuator.

5. A system for controlling delivery of fluid product as defined in claim 4, further comprising:
   an electrical cable extending from a battery to the actuator for powering the actuator.

6. A system for controlling delivery of fluid product as defined in claim 1, wherein the powered actuator further comprises:
   an actuator housing:
   a latch plate having a planar surface affixed to the actuator housing; and
   the electromagnet has a planar surface for engagement with the planar surface on the latch plate for maintaining the electromagnet in engagement with the latch plate when power is supplied to the electromagnet.

7. A system for controlling delivery of fluid product as defined in claim 6, further comprising:
a guide spaced axially from the planar surface of the electromagnet for guiding axial movement of the electromagnet within the actuator housing.

8. A system for controlling delivery of fluid product as defined in claim 7, further comprising:
a restrictor for limiting rotation of the guide with respect to the actuator housing.

9. A system for controlling delivery of fluid product as defined in claim 6, further comprising:
a shaft extending from the electromagnet through an end plate for engagement with the second tether; and
a bushing between the end cap and the shaft for guiding axial movement of the shaft within the actuator housing.

10. A system for controlling delivery of fluid product as defined in claim 1, wherein the electromagnet is fixed with respect to the one vessel; and
a latch plate moves axially relative to the electromagnet and has a latch plate planar surface for engagement with a planar surface of the electromagnet.

11. A system for controlling delivery of fluid product between a portable vessel mounted on a vehicle and another vessel, the vehicle including a manually operated product valve for controlling delivery of product, the system comprising:
a valve actuator connected to move the product delivery valve to a closed position;
a cam over lever attached by a first tether to the valve actuator;
a closure arm rotatable about a common axis with the cam over lever between an open position and a closed position;
a powered actuator connected with a second tether to the closure arm, such that when the closure arm is tripped, the second tether is slack, and the product valve is closed;
a shut off lever mounted on the vehicle;
a third tether between the closure arm and the shut off lever;
an electromagnet supported on the powered actuator and powered to retain the closure member in the open position, and the powered actuator pulls the second tether in response to an absence of power to the electromagnet to close the product delivery valve;
a handheld radio transmitter; and
a vehicle mounted receiver responsive to the handheld transmitter for selectively activating the actuator.

12. A system for controlling delivery of fluid product as defined in claim 11, further comprising:
the powered actuator including an actuator housing;
a biasing spring carried by the actuator housing for biasing the powered actuator to close the product delivery valve.

13. A system for controlling delivery of fluid product as defined in claim 11, further comprising:
an electrical cable extending from a vehicle battery to the actuator for powering the actuator.

14. A system for controlling delivery of fluid product as defined in claim 11, wherein the powered actuator further comprises:
an actuator housing;
a latch plate having a planar surface affixed to the actuator housing; and
the electromagnet has a planar surface for engagement with the planar surface on the latch plate for maintaining the electromagnet in engagement with the latch plate when power is supplied to the electromagnet.

15. A system for controlling delivery of fluid product as defined in claim 11, further comprising:
a guide spaced axially from the planar surface of the electromagnet for guiding axial movement of the electromagnet within the actuator housing; and
a restrictor for limiting rotation of the guide with respect to the actuator housing.

16. A method of controlling delivery of fluid product between one vessel mounted on a vehicle and another vessel, the one vessel including a manually operated product valve for controlling delivery of product, the method comprising:
providing a valve actuator connected to move the product delivery valve to a closed position;
attaching a cam over lever by a first tether to the valve actuator;
providing a closure arm rotated by the cam over lever between an open position and a closed position;
connecting a powered actuator with a second tether to the closure arm, such that when the closure arm is tripped, the second tether is slack, and the product valve is closed; and
supporting an electromagnet on the powered actuator and powered to retain the closure member in the open position, and the powered actuator pulls the second tether in response to an absence of power to the electromagnet to close the product delivery valve.

17. A method of controlling delivery of fluid product as defined in claim 16, further comprising:
the one vessel is a portable vessel mounted on a vehicle;
mounting a shut off lever mounted on the vehicle; and
connecting a third tether between the closure arm and the shut off lever.

18. A method of controlling delivery of fluid product as defined in claim 16, further comprising:
biasing the electromagnet to close the product delivery valve.

19. A method of controlling delivery of fluid product as defined in claim 16, further comprising:
providing a handheld radio transmitter; and
providing a receiver responsive to the handheld transmitter for selectively activating the actuator.

20. A method of controlling delivery of fluid product as defined in claim 17 further comprising:
providing an electrical cable to power the actuator; and
powering the powered actuator in response to signals from the receiver.

* * * * *